Figure 1:
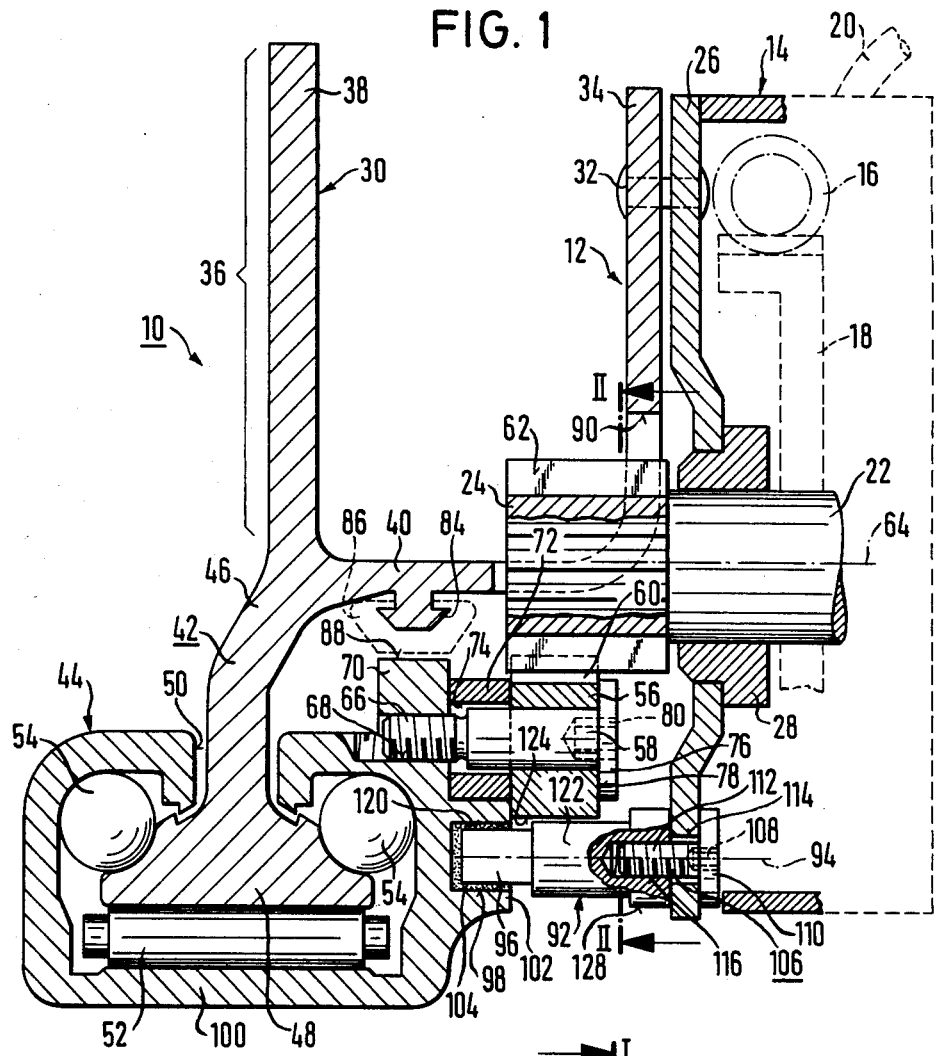

United States Patent [19]

Kaesling et al.

[11] Patent Number: 4,621,784
[45] Date of Patent: Nov. 11, 1986

[54] INSTALLATION FOR THE LONGITUDINAL ADJUSTMENT OF A SEAT

[75] Inventors: Heinz Kaesling, Grub a. Forst; Emil Dinkel, Coburg; Bernd Mann, Pfarrweisach, all of Fed. Rep. of Germany

[73] Assignee: Brose Fahrzeugteile GmbH & Co. KG, Coburg, Fed. Rep. of Germany

[21] Appl. No.: 705,794

[22] Filed: Feb. 26, 1985

[30] Foreign Application Priority Data

Mar. 15, 1984 [DE] Fed. Rep. of Germany ....... 3409582

[51] Int. Cl.⁴ ............................................. F16M 13/00
[52] U.S. Cl. .................................... 248/430; 248/419; 297/344
[58] Field of Search ............... 248/429, 430, 424, 419, 248/420; 297/344, 346; 308/3 R, 6 R

[56] References Cited

U.S. PATENT DOCUMENTS

| | | | |
|---|---|---|---|
| 2,953,190 | 9/1960 | Tanaka | 248/429 |
| 4,101,110 | 7/1978 | Voss et al. | 248/430 X |
| 4,159,815 | 7/1979 | Strowik et al. | 248/429 |
| 4,228,981 | 10/1980 | Rampel et al. | 248/430 |
| 4,272,048 | 6/1981 | Kluting et al. | 248/430 |
| 4,275,914 | 6/1981 | Holweg et al. | 248/429 X |
| 4,487,391 | 12/1984 | Rampel | 248/420 X |

FOREIGN PATENT DOCUMENTS 2718928  11/1978  Fed. Rep. of Germany ...... 248/430

*Primary Examiner*—J. Franklin Foss
*Assistant Examiner*—David L. Talbott
*Attorney, Agent, or Firm*—Barnes & Thornburg

[57] ABSTRACT

An installation 10 for the longitudinal adjustment of a seat, especially of a motor vehicle seat which includes a top rail 30 supporting the seat, which is form-lockingly longitudinally displaceably guided on a coordinated bottom rail 44. A drive mechanism 12 with drive pinion 24 is connected with one of the two rails; the drive pinion 24 engages into a toothed rack 56 mounted at the other rail 44 and extending along the same. In order to establish with a simple structure an always reliable mutual engagement of the pinion and toothed rack, also in case of high loads caused by accidents, the other rail 44 is provided with a guide groove 98 for at least one guide bolt 92 mounted at the drive mechanism 14 or at the rail 30 within the area of the pinion 24.

20 Claims, 2 Drawing Figures

INSTALLATION FOR THE LONGITUDINAL ADJUSTMENT OF A SEAT

The present invention relates to an installation for the longitudinal adjustment of a seat, especially of a motor vehicle seat.

An installation for the longitudinal adjustment of a seat with a top rail and coordinated bottom rail is described, for example, in the DE-OS No. 31 22 124. With the use of a drive mechanism with a drive pinion and toothed rack, it is desirable that the pinion remains in proper engagement with the toothed rack both during normal operation as also in case of strong horizontal load in the longitudinal direction (for example, in case of impact accidents).

The object of the present invention resides in assuring in an installation for the longitudinal adjustment of a seat of the aforementioned type, by structurally simmpe means a reliable mutual engagement of drive pinion and toothed rack also in case of increased loads.

The underlying problems are solved in accordance with the present invention in that one of top and bottom rails is provided with a guide groove extending within the area of the backside of the toothed rack opposite the row of teeth of the toothed rack for at least one guide element attached at the driving mechanism or at the other rail within the area of the pinion. In a preferred embodiment, the bottom rail is provided with the guide groove while the guide element is fastened to the top rail or to the housing of the drive mechanism fixed to the top rail. If, according to another feature of the present invention, the axis of the guide element constructed as guide bolt extends essentially parallel to the pinion axis, then the guide element keeps the pinion in optimum engagement with the toothed rack during normal operation and prevents an undesired longitudinal displacement of the seat notwithstanding a blocked drive pinion (especially by reason of the self-blocking of the connected transmission), in case increased forces act on the seat in the longitudinal direction (for example, in case of an impact accident). The forces exerted by the tooth flanks of the drive pinion on the toothed rack seek to push the toothed rack away from the drive pinion; these forces, however, are absorbed by the at least one guide element at the backside of the toothed rack and are transmitted from the guide element to the one rail supporting the drive pinion, on the one hand, directly by way of the fastening point of the guide element at the drive mechanism or at this rail and, on the other, indirectly by way of the guide groove, the other rail and by way of the form-locking mutual guidance onto the one rail. A fastening element, in particular, a fastening angle member for the direct connection of the end of the guide element which is located opposite the drive mechanism, respectively, the one rail, with the one rail can then be dispensed with. The manufacturing and assembly costs are correspondingly low. An improved mutual guidance results on the basis of the additional mutual guidance of the two rails by way of the guide element and the guide groove. Thus, above all a relatively large play of the mutual form-locking guidance of the two rails, conditioned on manufacturing considerations, can be reduced by the guide element and the guide groove, with the result of a particularly quiet, even operation and movement of the parts.

The guide element is constructed preferably as guide bolt whereby the guide bolt axis then extends essentially parallel to the pinion axis. Such a guide bolt can be acquired and assembled in a relatively cost-favorable manner.

Preferably, the at least one guide bolt projects from the same side of a drive housing of the drive mechanism as the drive pinion. With a corresponding construction of the rails, an opposite orientation is also possible in principle; the preferred orientation, however, facilitates considerably the assembly.

By reason of the indirect fastening of the free guide bolt end (by way of the other rail) at the one rail in accordance with the present invention in lieu of the aforementioned fastening element (angle member), there results the advantageous possibility to secure the toothed rack intermediate its ends at the other guide rail. This considerably increases the mechanical rigidity and stiffness of the arrangement. Fastening bolts, optimally threaded bolts, extending preferably transversely to the toothed rack longitudinal direction and parallel to the tooth flanks, are utilized for the fastening.

In a preferred embodiment of the present invention which is realizable also independently of the aforementioned guide element, the top rail includes a base rail form-locking engaging into the bottom rail, which starts from an essentially U-shaped main profile section with upwardly projecting side legs, whereby the base bar is formed in one piece with the main profile section. The base bar serves the form-locking mutual support of the two rails and the main profile section serves the connection with the seat with simultaneous reinforcement of the top rail. The one-piece construction of the base bar with the main profile section assures low manufacturing and assembly costs.

According to still another feature of the present invention, the drive mechanism may be secured at one of the two lateral legs.

For the additional reinforcement of the top rail, a web is provided which extends along the center leg of the main profile section of the top rail.

The top rail profile as described above which is of relatively complicated shape, is preferably obtained by extrusion.

The web provided at the top rail may also abut as additional support of the top rail against the bottom rail on a web abutment surface of the bottom rail, at least with an increased load of the seat from above (heavy person on the seat). For reducing the slide friction, the web and/or the web abutment surface may be provided with a slide element. Plastic sliders, slide material coatings or the like may be used as slide elements. For reducing the friction between guide element and guide groove, the guide element and/or the guide groove may also be provided with such a slide element.

Figure 2:
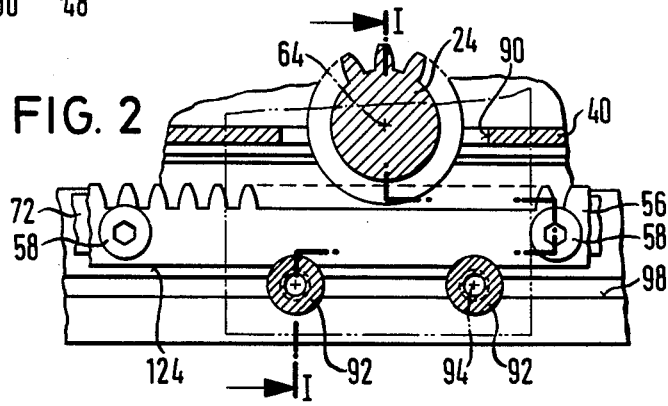

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through the top rail and the bottom rail within the area of the drive pinion of a longitudinal seat adjustment installation in accordance with the present invention, taken along line I—I in FIG. 2; and FIG. 2 is a partial detailed cross-sectional view taken along line II—II of FIG. 1.

Referring now to the drawing wherein like reference numerals are used throughout the two views to designate like parts, and arrangement generally designated by reference numeral 10 for the longitudinal adjustment of a motor vehicle seat is illustrated in these two figures, and more particularly within the area of the drive mechanism generally designated by reference numeral 12. The drive mechanism 12 includes a drive housing generally designated by reference numeral 14 which is shown only in part and whose contours are indicated in dashed lines. A worm gear drive (not illustrated in detail) is arranged inside of the drive housing 14, which includes a worm 16 indicated in dash and dotted lines that meshes with a worm gear 18 indicated in dashed line. The worm 16 is connected with an electric motor unit (not shown) by way of a flexible connecting shaft 20. The worm gear 18 is non-rotatably mounted on a shaft 22 which carries a drive pinion 24 on its end located outside of the housing 14 (in FIG. 1 to the left); the drive pinion 24 is non-rotatably connected in this manner with worm gear 18. The shaft 22 is rotatably supported in a base plate 26 of the housing 14 by way of a bearing ring 28.

The drive housing 14 is rigidly secured at a top rail generally designated by reference numeral 30, for example, by means of double rivet heads 32 indicated in FIG. 1 which rigidly connect the base plate 26 with one lateral leg 34 of an essentially U-shaped main profile section 36 of the top rail 30. Both side legs 34 and 38 point vertically in the upward direction; the center leg 40 of the U-shape extends essentially horizontally or with an eventual inclination of the top rail 30, correspondingly inclined.

A base bar 42 extends from the U-profile-corner remote from the drive housing 14 and formed by the legs 38 and 40, which engages form-lockingly into a bottom rail generally designated by reference numeral 44 and for that purpose is constructed essentially T-shaped in the cross section of FIG. 1, whereby the T is inverted and the slightly angularly bent T-leg 46 terminates in the main profile section 36. The T-bar 48 at the bottom of the base bar 42 is disposed inside of the bottom rail 44 which is essentially C-shaped in cross section. The T-base 46 extends through an upwardly disposed longitudinal slot 50 between the mutually facing ends of the C-profile shape.

The T-bar 48 is supported in the downward direction at the inside of the bottom rail 44 by way of roller bearings 52; ball bearings 54 on both sides of the slot 50 inside of the C-profile shape are supported, on the one hand, at the top side of the T-bar 48 facing the T-leg 46 and, on the other, at the inside of the C-profile shape on both sides of the slot 50.

The drive pinion 24 engages in a toothed rack 56 which is rigidly secured at the bottom rail 44, and more particularly, for example, by means of threaded bolts 58 which can be seen in FIGS. 1 and 2. The longitudinal direction of the toothed rack 56 extends parallel to the longitudinal direction of the two rails 30 and 44 (perpendicular to the plane of the drawing in FIG. 1). The toothed flank 60 and 62 of the toothed rack teeth respectively of the drive pinion teeth extend correspondingly parallel to the pinion axis 64 which extends horizontally and perpendicularly to the rail longitudinal direction. The threaded bolts 58 are screwed with their threaded end section 66 into corresponding threaded bores 68 of a longitudinal web 70 of the bottom rail 44. This longitudinal web 70 projects upwardly within the area of the right upper corner of the C-profile shape in FIG. 1 (the C lying on its back). A spacer bar 72 is fitted in-between the web 70 and the toothed rack 46 which is provided with corresponding through-bores 74 for the threaded bolt 58. The threaded bolts abut with their threaded bolt head 76, in FIG. 1 on the right side, at the vertical side surface 78 of the toothed rack 56 opposite the bottom rail 44. A polygonal recess 80 in the threaded bolt head 76 can be further seen in the drawing which is intended for the engagement of a corresponding tool.

For increasing the stiffness, especially against bending-through about a horizontal bending axis perpendicular to the rail longitudinal direction, the main profile section 30 is additionally reinforced, namely, by means of a web 84 extending in the rail longitudinal direction and provided at the bottom side of the center leg 40 of the top rail 30. The web 84 is of approximately T-shape (inverted T). The ends of the T-bar are bevelled off at the bar bottom side in order to facilitate the assembly when sliding a C-profile-shaped slide rail 86 over the T-bar of the web 84; this slide rail 86 is indicated in FIG. 1 in dash lines. In case of a high seat load, the slide rail 86 comes into abutment against the top side 88 of the longitudinal web 70 of the bottom rail 44. By reason of the used plastic material, a low friction coefficient will result so that notwithstanding mutual abutment an easy movement and operation is assured.

In order that the drive pinion 24 can engage from the top rail 12 without obstruction into the toothed rack 56 extending below the center leg 40, the top rail 30 is provided within the corner area between the center leg 40 and the right side leg 34 in FIG. 1 with a correspondingly large aperture 90.

A guide bolt 92 is screwed fast in the drive housing 14, especially at the base plate 26. The guide bolt axis 94 extends parallel to the pinion axis 64 so that the guide bolt 92 projects in the same direction from the housing 14 as the drive pinion 24. The free end 96 of the guide bolt 92 which is arranged to the left in FIG. 1, engages in a guide groove 98 which is machined into the right side leg 102 projecting upwardly from the center leg 100 of the C-profile shape of the bottom rail 44. The guide groove 98 is rectangular in the cross section of FIG. 1 and open toward the right. Its dimensions are matched to those of the free end 96 of the guide bolt 92. For reducing the friction between the guide groove 98 and the guide bolt 92, the guide groove may be provided with a slide layer 104 of plastic material with a low friction coefficient. Additionally or in lieu of this slide layer 104, also the end 96 of the guide bolt 92 may be coated correspondingly.

The guide bolt 92 is rigidly connected with the base plate 26 of the housing 14, especially by the threaded connection indicated in FIG. 1. This threaded connection consists of a threaded bolt 106 whose bolt head 110 provided with an internal polygon 108 abuts against the inside of the base plate 26 and whose threaded section 112 starting from the head 110 initially extends through a correspondingly dimensioned bore 114 of the base plate and then subsequently is screwed into an axially extending internal thread 116 at the right end of the guide bolt 92.

The guide bolt 92 may be constructed step-shaped with a first step section 120 forming the end 96 for the engagement in the guide groove, with an adjoining section 122 of larger diameter for the abutment at the toothed rack backside 124 as well as finally with a third section 128 again of increased diameter which forms the right bolt end and takes care for a mechanically stable connection between guide bolt 92 and base plate 26.

Both the top rail 30 as also the bottom rail 44 are extruded in one piece with the use of an appropriate aluminum alloy. A high mechanical rigidity of the arrangement results by reason of the described configuration. The assembly of the toothed rack 56 can be carried out without problems because only the bolts 58 have to be screwed-in under interposition of the spacer rail 72. The threaded bolts 58 may be distributed over the entire toothed rack length at practically any desired spacing corresponding to the desired mechanical requirements. According to FIG. 2, two guide bolts 92 are to be screwed into the base plate 26 by means of the threaded bolts 106. The bolts 92 are preferably arranged in such a manner that the intersection of their axes 94 with the plane of the drawing of FIG. 2 forms an approximately equilateral triangle with the corresponding intersection of the pinion axis 64. In this manner a reliable mutual engagement of drive pinion 24 and toothed rack 56 is assured both during the normal operation as also in case of high longitudinal loads on the seat conditioned by accidents because the guide bolts 92 keep the toothed rack 56 at the drive pinion 24. The provision of two guide bolts in the indicated arrangement in lieu of a single bolt underneath the pinion axis 64 which would be sufficient as such, increases the mechanical stability because the occurring forces are distributed over two guide bolts.

The assembly of the top rail 30, itself preassembled with the drive mechanism 14 and the guide bolts 92, with the bottom rail 44 takes place simply in that one threads at the same time the base bar 48 of the top rail into the bottom rail 44 and the guide bolt 92 into the guide groove 104 whereby the drive pinion 24 comes automatically into engagement with the toothed rack 56.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the longitudinal adjustment of a seat, comprising at least a top rail means adapted to support the seat, said top rail means being form-lockingly and longitudinally displaceably guided in a coordinated bottom rail means, and dirve means operatively connected with one of the coordinated rail means, said drive means including a drive pinion which engages in a toothed rack mounted at the other rail means and exetnding along the same, the top rail means being made in one piece and including a base bar form-lockingly engaging into the bottom rail means, and said base bar starting from an essentially U-shaped main profile section of the top rail means having upwardly projecting side legs.

2. An installation according to claim 1, wherein said base bar starts within the area of one of the two profile corners formed between a side leg and the center leg.

3. An installation according to claim 1, wherein the drive means is secured at one of the two side legs.

4. An installation according to claim 1, wherein the center leg of the main profile section of the one rail means is reinforced by a web means extending in the rail longitudinal direction.

5. An installation according to claim 1, wherein at least one of the rail means is formed by an extruded profile.

6. An installation according to claim 4, wherein at least one of web means and web abutment surface means of the bottom rail means facing the web means is provided with a slide means.

7. An installation according to claim 4, wherein at least one of guide means and guide groove means is provided with a slide means.

8. An installation for the longitudinal adjustment of a seat, comprising at least one top rail means adapted to support the seat, a coordinated bottom rail means, said top rail means is of one-piece construction and longitudinally displaceably guided at said bottom rail means and includes a base bar form-lockingly engaging into the bottom rail means, said base bar starting from an essentially U-shaped main profile section with substantially upwardly projecting side legs, and drive means operatively connected with one of the two coordinated rail means, said drive means including a drive pinion, a toothed rack mounted at the other rail means and extending along the same, the other rail means being provided with a guide groove means extending within the area of the toothed rack-backside opposite the row of teeth of the toothed rack, and at least one guide element mounted at one of drive means or said one rail means within the area of the pinion for engagement in said guide groove means.

9. An installation according to claim 8, wherein said base bar starts within the area of one of the two profile corners formed between a side leg and the center leg of the U-shaped main profile section.

10. An installation according to claim 8, wherein the drive means is secured at one of the two side legs.

11. An installation according to claim 8, wherein the center leg of the main profile section of the one rail means is reinforced by a web means extending in the rail longitudinal direction.

12. An installation according to claim 11, wherein at least one of web means and web abutment surface means of the bottom rail means facing the web means is provided with a slide means.

13. An installation according to claim 8, wherein the drive means includes a drive housing, and wherein the at least one guide element is constructed as a guide bolt with an axis extending essentially parallel to the pinion axis and projecting from the same side of the drive housing as the drive pinion, and wherein the toothed racked intermediate its ends is secured at the other rail means.

14. An installation according to claim 13, wherein said base bar starts within the area of one of the two profile corners formed between a side leg and the center leg of the U-shaped main profile section.

15. An installation according to claim 13, wherein the drive means is secured at one of the two side legs.

16. An installation according to claim 15, wherein the center leg of the main profile section of the one rail means is reinforced by a web means extending in the rail longitudinal direction.

17. An installation according to claim 16, wherein at least one of the rail means is formed by an extruded profile.

18. An installation according to claim 17, wherein said profile is made of an aluminum alloy.

19. An installation according to claim 16, wherein at least one of web means and web abutment surface means of the bottom rail means facing the web means is provided with a slide means.

20. An installation according to claim 19, wherein at least one of guide means and guide groove means is provided with a slide means.

* * * * *